United States Patent
Giraldin et al.

(10) Patent No.: US 7,030,765 B2
(45) Date of Patent: Apr. 18, 2006

(54) MESSAGE COMMUNICATION SYSTEM AND METHOD

(75) Inventors: Timothy W. Giraldin, Ladera Ranch, CA (US); Patrick W. Giraldin, Ladera Ranch, CA (US); Regan E. Kelly, Laguna Niguel, CA (US); Martin F. Crowley, Lake Forest, CA (US); Eric Couch, Trabuco Canyon, CA (US); Ya-Tin Gross, Ladera Ranch, CA (US)

(73) Assignee: SafeTzone Technologies Inc., Laguna Hills, CA (US)

( * ) Notice: Subject to any disclaimer, the term of this patent is extended or adjusted under 35 U.S.C. 154(b) by 133 days.

(21) Appl. No.: 10/716,583

(22) Filed: Nov. 18, 2003

(65) Prior Publication Data

US 2004/0100364 A1   May 27, 2004

Related U.S. Application Data

(60) Provisional application No. 60/427,901, filed on Nov. 19, 2002, provisional application No. 60/427,874, filed on Nov. 19, 2002, provisional application No. 60/427,875, filed on Nov. 19, 2002, provisional application No. 60/427,731, filed on Nov. 19, 2002, provisional application No. 60/427,713, filed on Nov. 19, 2002.

(51) Int. Cl.
*G08B 23/00* (2006.01)

(52) U.S. Cl. ............. 340/573.1; 340/7.55; 340/539.13; 340/539.2; 340/825.49; 455/404.2

(58) Field of Classification Search ............. 340/573.1, 340/539.13, 539.2, 825.49, 7.55, 7.28; 455/404.1, 455/404.2, 456.1, 457
See application file for complete search history.

(56) References Cited

U.S. PATENT DOCUMENTS

| | | | |
|---|---|---|---|
| 5,987,421 | A | 11/1999 | Chuang |
| 6,208,934 | B1 | 3/2001 | Bechtolsheim et al. |
| 6,396,475 | B1 | 5/2002 | Ellenby et al. |
| 6,424,264 | B1 | 7/2002 | Giraldin et al. |
| 2002/0080198 | A1 | 6/2002 | Giraldin et al. |
| 2002/0120398 | A1 | 8/2002 | Malsuda et al. |

*Primary Examiner*—Thomas Mullen
(74) *Attorney, Agent, or Firm*—Duckor Spradling Metzger & Wynne; Bernard L. Kleinke, Esq.

(57) ABSTRACT

The disclosed embodiments of the invention relate to a system and method of message communication for a confined area of a facility. A personal identification information of one member of a group is entered into at least one of a set of stations distributed throughout the confined area. A message is displayed in response to the receipt of the personal identification information. A request to find the location of the members of the group can be entered into at least one of the group of stations.

24 Claims, 13 Drawing Sheets

PARK TO GUEST MESSAGING MODE

⬇

| Authorized Park personnel may operate the Park to Guest Messaging system by accessing the system via an authorized code. |
|---|

~201

⬇

| The Park programs information into the system via keyboard, so that at various times during the day, a message will be sent into the system that will be displayed at each LocationStation when that LocationStation is accessed by any guest wearing a Locator. |
|---|

~203

⬇

| To enter into 'PARK TO GUEST MESSAGING' MODE the guest approaches LocationStation and waves his or her Locator at the designated spot on LocationStation |
|---|

~206

⬇

| When the guest accesses LocationStation by waving his or her Locator at LocatinStation, the park map will appear with the various functions in view on the top and sides, and bottom of the screen. At the top of the screen will appear a streaming banner with the latest message that the park wishes to communicate to the guest, i.e., "a parade will begin at 1:00 p.m. on Main Street" or "your daughter is at First Aid", weather conditions, a list of rides with short wait lines, show times or promotions underway at that moment, or even emergency situations, etc. |
|---|

FIG. 2

GUEST TO GUEST MESSAGING MODE

When the guest accesses LocationStation by waving his or her Locator at LocationStation, the park map will appear with the various functions in view on the top and sides of the screen.

~501

/504

The guest will select the "Mailbox" icon from the side or bottom of the screen will appear. When the guest engages the mailbox icon or menu, a keyboard will appear on the LocationStation touch screen monitor. The guest will type the message to any member of his or her group to be read the next time any member of that group accesses LocationStation. The message will be displayed with the time of origination and will remain available through the end of the day.

FIG. 5

VIDEO COMMERCIALS AND ADVERTISING AT LOCATIONSTATION MODE

When the guest accesses LocationStation by waving his or her Locator at LocationStation, the park map will appear with the various functions in view on the top and sides of the screen.

~701
/703 

LocationStations can be configured to play short movie files when not being accessed by guests for information and services. Using DVD, AVI or other technology, the LocationStation when idle can run commercials, promotional visual applications to educate, entertain, or alert park guests. Wearing Locators is not required for access to this mode. It is immediately rendered idle upon activation of LocatinStation by a Locator wearing guest.

FIG. 7

EMAIL NOTICES OF ALERT

Guest will elect at RegiStation during registrations of his or her group whether they want to be alerted via email to their phone or pager or other web enabled apparatus if someone in thier party accesses the "I AM LOST" or "ONE OF MY PARTY IS LOST" button on LocationStation.

~1001

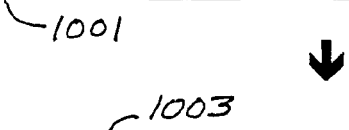

~1003

When any member of the group uses the "I AM LOST" OR SOMEONE IN MY PARTY IS LOST" button on LocationStation, the "Alert" generated by use of these buttons will go automatically to the registered web enabled group member, instead of or in or in conjunction with the "Alert" to security.

FIG. 10

EVENT MESSAGING VIA EMAIL

~1301

Guests who register for the system may at RegiStation may also elect to receive event messages during the course of the day from the Park to Guest Messaging System

FIG. 13

MESSAGE COMMUNICATION SYSTEM AND METHOD

RELATED APPLICATION

The following non-provisional applications are related to the present invention and are hereby incorporated by reference in their entirety: U.S. patent application, Ser. No. 09/992,872, titled "IDENTIFICATION TAG FOR REAL-TIME LOCATION OF PEOPLE," filed Nov. 13, 2001, now U.S. Pat. No. 6,747,562, and U.S. patent application, Ser. No. 09/992,668, filed Nov. 13, 2001 and titled "SYSTEM FOR REAL-TIME LOCATION OF PEOPLE IN A FIXED ENVIRONMENT. "

This application claims priority to the following provisional applications and are hereby incorporated by reference in their entirety: U.S. Provisional Patent Application, Ser. No. 60/427,901, titled MESSAGE COMMUNICATION SYSTEM AND METHOD, filed Nov. 19, 2002, U.S. Provisional Patent Application, Ser. No. 60/427,874, titled QUEUE MANAGEMENT SYSTEM AND METHOD, filed Nov. 19, 2002, U.S. Provisional Patent Application, Ser. No. 60/427,875, titled ROUTE PLANNING SYSTEM AND METHOD, filed Nov. 19, 2002, U.S. Provisional Patent Application, Ser. No. 60/427,731, titled CASHLESS SPENDING SYSTEM AND METHOD, filed Nov. 19, 2002, and U.S. Provisional Patent Application, Ser. No. 60/427,713, titled DATA ANALYSIS SYSTEM AND METHOD, filed Nov. 19, 2002.

This application claims priority to the following non-provisional applications and are hereby incorporated by reference in their entirety: U.S. Non-provisional patent application, Ser. No. 10/717,052, titled QUEUE MANAGEMENT SYSTEM AND METHOD, filed Nov. 18, 2003, U.S. Non-provisional patent application, Ser. No. 10/716,800, titled ROUTE PLANNING SYSTEM AND METHOD, filed Nov. 18, 2003, U.S. Non-provisional patent application, Ser. No. 10/716,802, titled CASHLESS SPENDING SYSTEM AND METHOD, filed Nov. 18, 2003, and U.S. Non-provisional patent application, Ser. No. 10/716,691, titled DATA ANALYSiS SYSTEM AND METHOD, filed Nov. 18, 2003.

BACKGROUND OF THE INVENTION

1. Field of the Invention

The present invention relates in general to a message communication system and method. It more particularly relates to a message communication system and method, which may be used in a confined environment or other area, such as an amusement park, a theme park, a large retail store, a casino, a ship, or the like.

2. Background Art

The information contained in this section relates to the background of the art of the present invention without any admission as to whether or not it legally constitutes prior art.

In large confined areas where patrons or guests are invited for commercial activity; groups of individuals can become separated from their group, either intentionally or unintentionally. This may happen in a variety of such confined areas, such as amusement parks, theme parks, large retail outlets, or other such large commercial establishments.

It is highly desirable to be able to provide a communication system for the patrons or guests in such facilities. For example, when children become separated from their parents, it may be important in some situations to provide for the communication between the parents and their children. Also, in such situations, it may be desirable for the management of the establishment to be able to communicate directly with individual patrons or guests while in the environment.

The prior known conventional technique of employing a loud speaker for paging a person is not always practical or desirable for many facilities, especially ones that may be out of doors or otherwise not adapted to such techniques. Such loud speaker communication techniques, of course, do not lend itself for private communications between guests and patrons.

Therefore, it would be highly desirable to have improved techniques for communicating between the management of a facility and individual guests, or patrons, or between individual patrons or guests with other individual patrons or guests.

BRIEF DESCRIPTION OF THE DRAWINGS

In the following, the invention will be explained in further detail with reference to the drawings, in which:

FIGS. 2, 5, 7, 10 and 13 are flow chart diagrams illustrating various methods of the disclosed embodiment of the invention.

DESCRIPTION OF CERTAIN EMBODIMENTS OF THE INVENTION

The disclosed embodiments of the invention relate to a system and method of message communication for a confined area of a facility. A personal identification information of one member of a group is entered into at least one of a set of stations distributed throughout the confined area. A message is displayed in response to the receipt of the personal identification information. A request to find the location of the members of the group can be entered into at least one of the group of stations.

According to certain disclosed embodiments of the invention, a message communication system and method relate to the use of stations distributed throughout a confined area of a facility such as a zoo, waterpark, theme park, amusement park, cruise ship or other, for receiving messages from guests or patrons invited into the area, or from the management personnel for the area. The messages are communicated to other stations throughout the area so that other guests or patrons can receive the messages.

According to other embodiments of the invention, a message can be entered into a station, and sent to a host computer or server, which transmits the message to a wireless device, such as a mobile telephone, personal digital assistant or other internet enabled device.

According to other disclosed embodiments in the invention, the stations distributed throughout the confined area may be programmed to display advertising messages or other promotional messages to the patrons or guests located within the confined area.

Person Locating System

Many patrons who visit large confined commercial facilities of a facility such as zoos, waterparks, theme parks, amusement parks, large retail stores, casinos, ships and others have at some point, experienced the feeling of temporarily losing another member of their group or family. It may be easy under some circumstances for an individual to become lost in a crowd, where the person only a short distance such as twenty feet away from the rest of the group and yet the group may not be able to find him or her.

Figure 1:
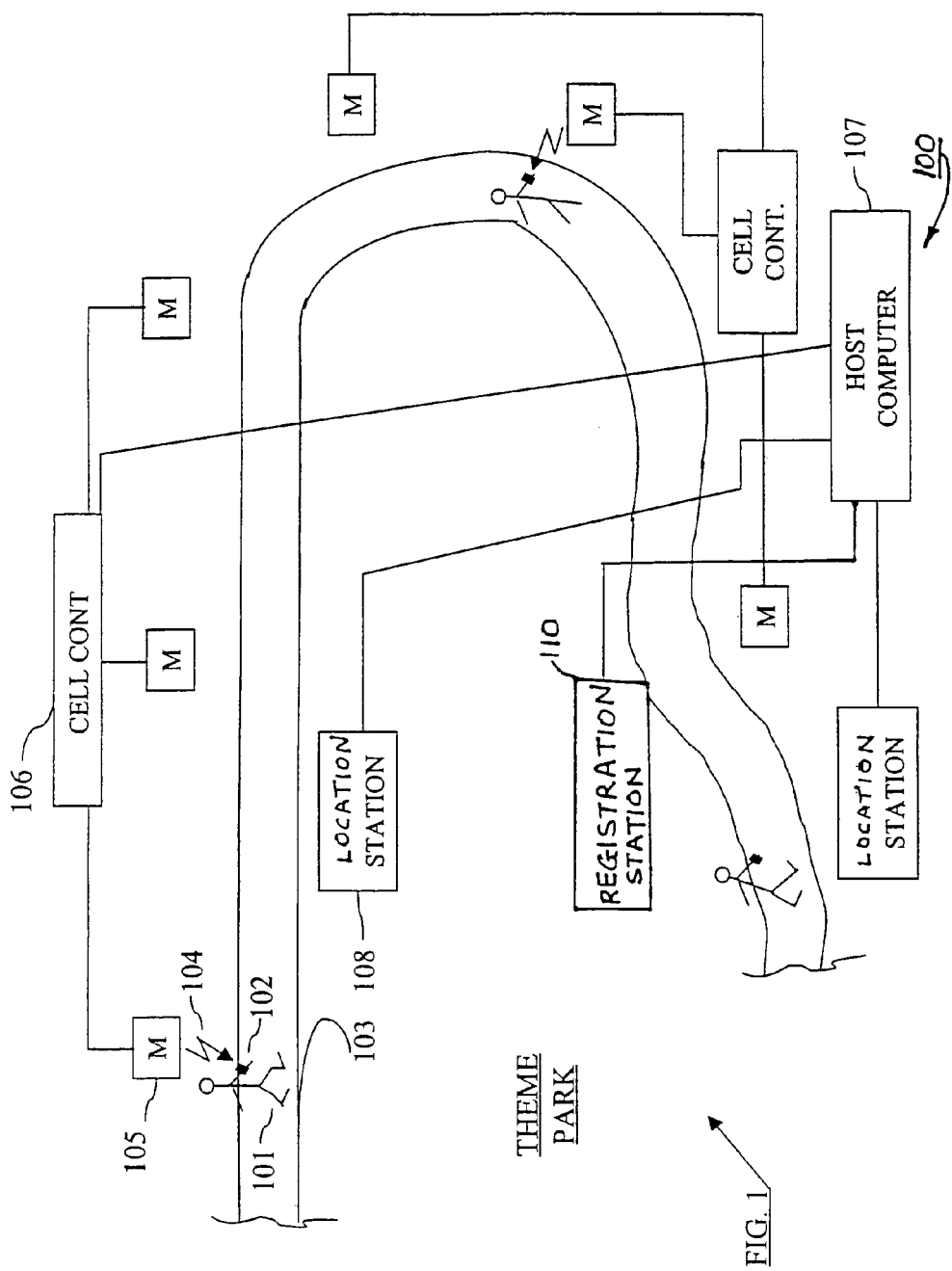
FIG. 1 is a diagrammatic view of a person locating system, which is at least part of the disclosed embodiment of the invention.

As shown in FIG. 1, an interactive person locating system 100 employs location stations such as station 108 distributed throughout the confined area to facilitate communication between and among member of the groups of patrons such as patron 101. A registration station 110 enables patrons to register their group so that members of the registered group can communicate privately with one another.

Group members or guests who interact with the system, at any location station, have the ability to visually discover the location of their group members on an electronic version of the facility or park map.

The members or guests are thus empowered to become a part of the solution in finding one another; to give them the ability to at least know where the rest of the party is when they cannot be found, or when they become separated by choice or by accident; to eliminate the feeling of panic that sweeps over a parent when they realize that a member of their group, such as their child, is not by their side or at the designated meeting place.

It helps for group members such as parents to know promptly that their children are still in the park, waiting in line for a ride or just running late.

Each member of a group obtains a waterproof transmitter in the form of a locator or personal identification (i.d.) tag 102 that is worn on the wrist or other part of the body or on the person's clothing. This locator continually communicates, via radio signal, with the child locating system 10 to update his or her location throughout the day. One example of such a tag is dislocated in the foregoing mentioned non-provisional patent application Ser. No. 09/992,872.

The location station 108 is a strategically placed interactive viewable workstation kiosk. These stations allow unaided guest access to the system with the locator 102. This gives the guest the ability to locate and view any locators in their group, to post messages on a private message board or to contact security. It also allows users to interact with any other system feature of module.

The registration station 110 is an interactive viewable workstation used by the park. The registration station 110 software module activates the locating software by enabling quick and easy registration of groups and individuals into the system 100 so that the system distinguishes between groups and between individuals within groups.

The confined area such as a park is divided into zones. These zones are the areas inside the property where guests need to be located. A zone can be as large or as small as needed. They can also be adjusted, expanded or minimized as necessary.

Guests are tracked as they pass along a path 103 through these zones via antennas such as an antenna 105 that are strategically placed throughout the property. These antennas, in return, send the tracking information to cell controllers such as cell controller 106, which conveys the information back to the central processing server or host computer 107 utilizing a wireless network. One example of such a system for the real-time location of people in a fixed environment is disclosed in the foregoing mentioned non-provisional patent application Ser. No. 09/992,668.

Intra-Facility Messaging

Figure 8:
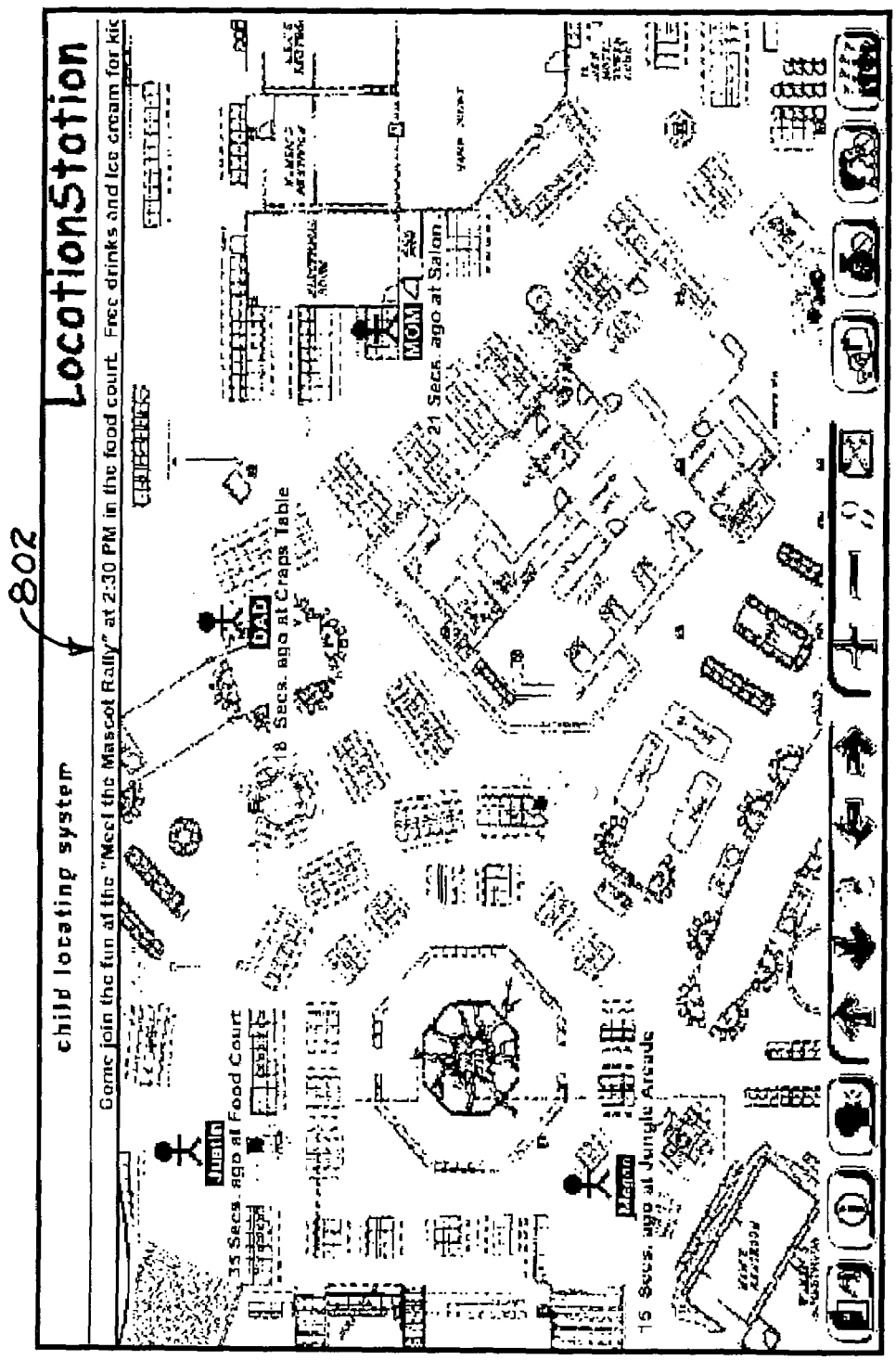

The intra-facility messaging system and method according to the disclosed embodiments of the invention include a software module which enables park personnel to send general interest messages to all groups of members or all guests to be viewed at any location station such as the station 108. To gain access to facility messages, patrons simply scan their locator or personal identification (i.d.) tag, such as the tag 102, at a location station such as the station 108 to enter his or her personal identification information, and the facility message is automatically displayed. Examples of facility messages include: show times or advertisements; restaurant advertisements; a list of rides with short or long wait times; weather information; and real time promotions and special discount offers, as well as others. For example, a facility message 802 is illustrated in FIG. 8 and invites the members to the "Meet the Mascot Rally."

These messages can be pre-set to appear at set times during the day. Messages can also be added during park hours and appear on the location stations throughout the park or other confined area, that same day.

Group Member Messaging

A group member or guest has the ability to leave messages for other group members by utilizing the message board feature at any location station such as the station 108. The next time the group or group member intended to receive the message uses a location station, the group member message automatically is displayed.

Commercial Messaging

The location stations, such as the station 108, while idle, can be configured to display commercial messages such as to play short movie files similar to a screen saver. At the request of the facility, these commercial messages such as movies can be used for park promotions, or even partner advertisements.

The location stations are idle when group members are not accessing them. At such times, commercial messages may be displayed.

Facility-To-Group Member Messaging

Referring now to FIG. 2, the system can operate in a facility-to-group member or park-to-guest mode of operation. The group member or guest may be registered as a user via the registration station 110 (FIG. 1) of the child location system 100 in order to receive park-to-guest messaging.

The facility-to-group member messaging enables general interest or group specific messages to be sent to groups which have been previously registered. Such messages can be directed to all registered groups or to specific individual groups or individual group members.

As indicated at box 201 of FIG. 2, authorized park personnel may operate the park-to-guest messaging system by accessing the system 100 via an authorized code.

Figure 3:
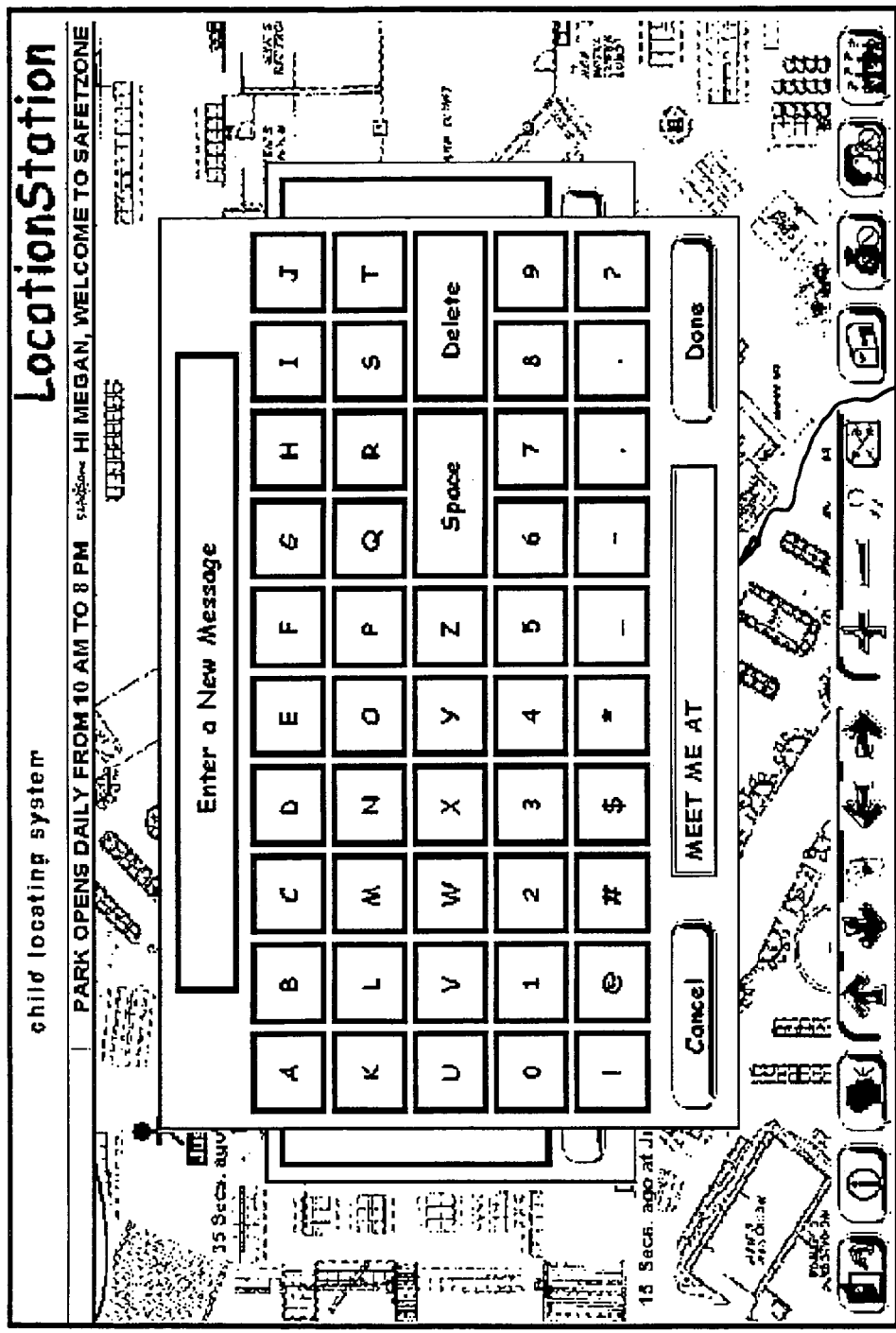
FIGS. 3, 4, 5A, 6, 8, 9, 11 and 12 are screen shot diagrams of a location station screen indicating various methods of operation of the system of FIG. 1.

As indicated at box 203, the facility or park programs information into the system 10 via a data entry device such as a soft keyboard 301 of a station screen 303 as shown in FIG. 3, or other download. Thus, at various times during the day, a message is sent to the system 10 that is displayed at each location station when that location station is accessed by any group member or guest wearing or otherwise using a locator or personal i.d. tag such as a tag 102.

Figure 4:
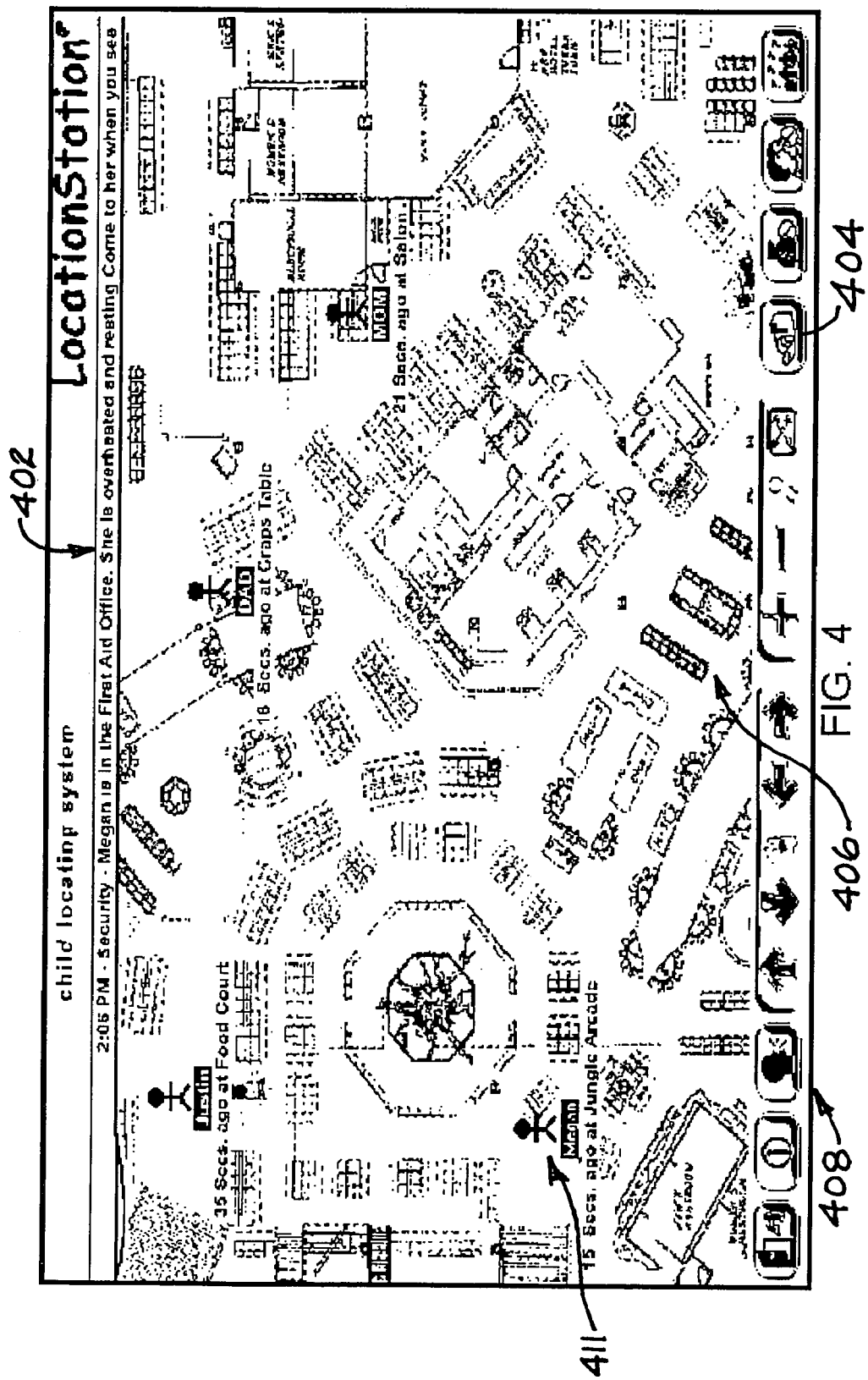

As shown in box 206, to access 'PARK TO GUEST MESSAGING' MODE, the guest or group member approaches a location station such as the station 108, and waves his or her locator or tag at the designated spot or designated area on the location station. When the guest accesses a location station by waiving his or her locator at the location station to enter his or her personal identification information, a facility or park map such as map 406 of FIG. 4, appears on a screen 404 with the various functions in view such as at the bottom of the screen 408. At the top of the screen appears a facility-to-group member message such as a streaming banner with the latest message that the park wishes to communicate to the guest, such, for example, as the following: "a parade will begin at 1:00 p.m. on Main Street" or "your daughter is at First Aid", or such items as weather conditions, a list of rides with short wait lines, show times, or promotions underway at that moment, or even emergency situations, and others. For example, as shown in FIG. 4, a message 402 is displayed that at "2:06 PM—Security—Megan is in the First Aid office. She is overheated and resting. Come to her when you see this message." The location of the group member ("Megan") is also displayed with an icon 411 illustrated on a map of the park.

Referring now to FIG. 5, member-to-member, or guest-to-guest, messaging mode will now be described. The guest must be registered as a user via the registration station 110 (FIG. 1) of the person locating system 100 (FIG. 1) in order to use the guest-to-guest messaging function. As indicated at box 501—of FIG. 5, when the guest accesses a location station by waiving his or her locator or i.d. tab at the location station to enter his or her personal identification information, the facility or park map such as the map 406 of FIG. 4, appears with the various functions in view such as at the bottom of the screen 408.

Figure 5A:
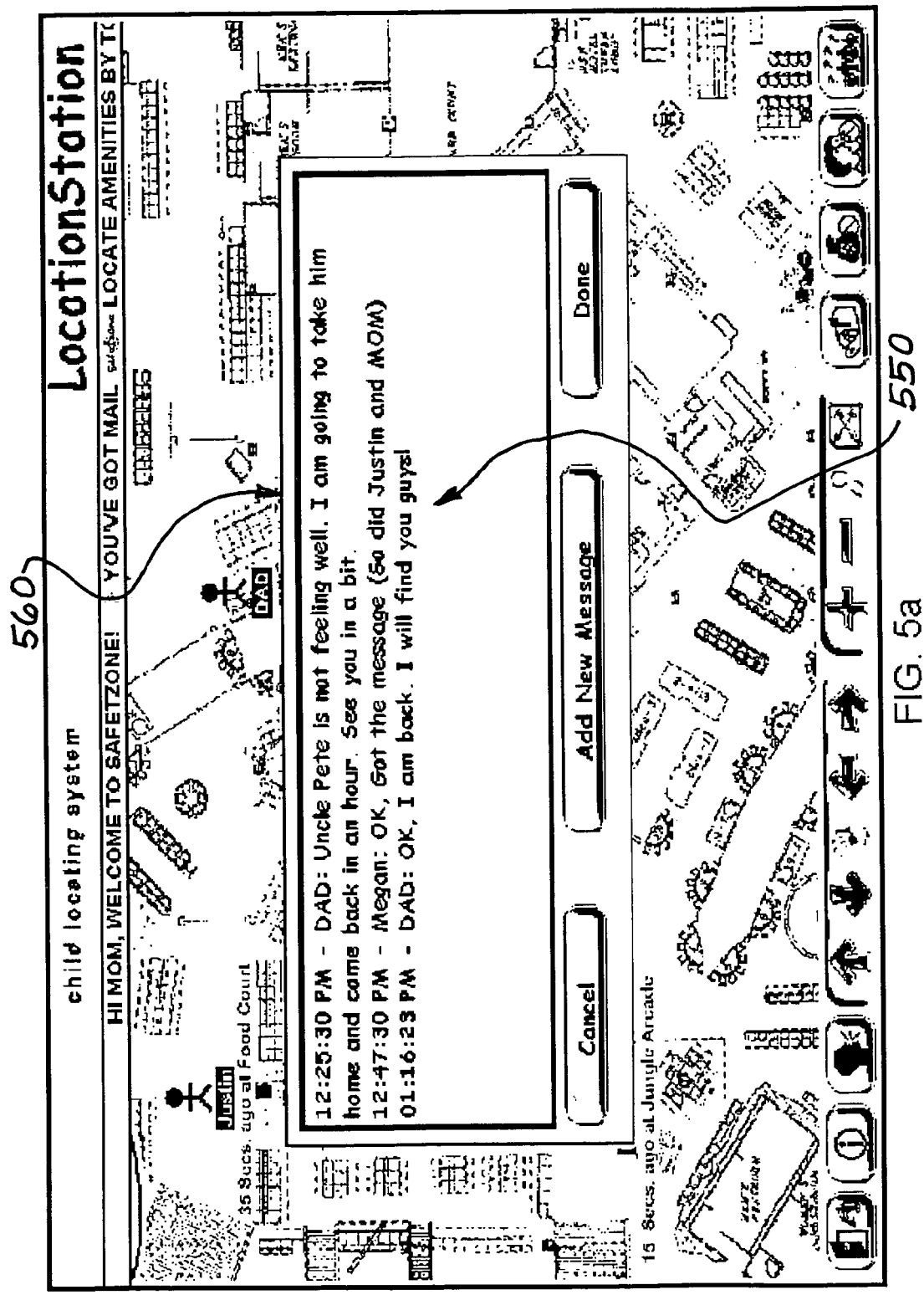

As indicated at box 504, the guest selects the "Mailbox" icon 404 (FIG. 4) from the side or bottom of the screen 408. When the guest engages the mailbox icon 404 or other menu selection, the keyboard 301 appears on the location station touch screen monitor as shown in FIG. 3. The guest types the message to any member of his or her group to be read the next time any member of that group accesses a location station within the confined area. The message is displayed with the time of origination and will remain available through the end of the day. As shown in FIG. 5A, each member of the group or other authorized person can leave a message such as a message 550 on a message board 560, and each message remains displayed showing who sent the message and when it was entered.

Figure 6:
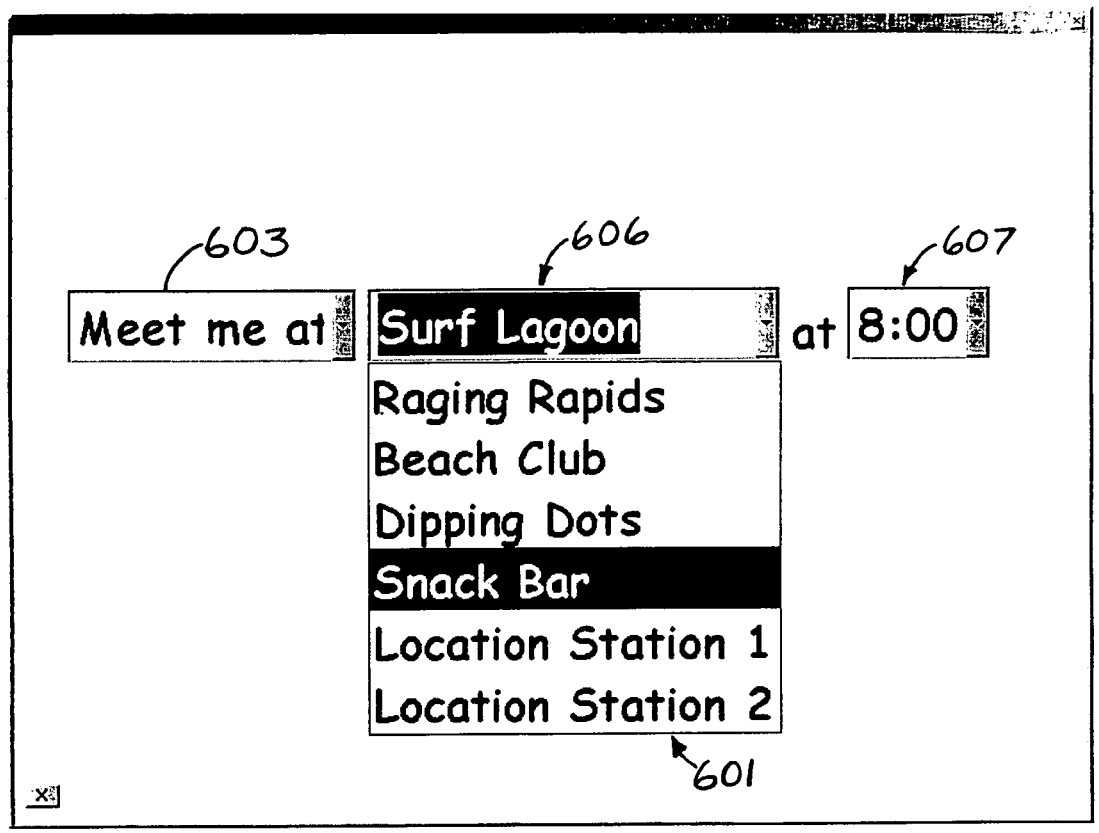

As an alternative method of creating messages instead of using a keyboard entry, certain standard pre-stored messages may be created as indicated in FIG. 6. When the mailbox icon 404 is pressed as indicated in FIG. 4, a drop down banner 601 appears as indicated in FIG. 6 to provide certain selections including a request such as "Meet me at" message 603. Also, a place menu 606 and time menu 607 is selected by using drop down menus. Using the touch screen of the location station, the selections can be made quickly so that a message is created and sent in a rapid manner.

Referring now to FIG. 7, a video commercial and advertising mode of operation at a location station will now be described. The guest need not be a registered user of the locating system 100 (FIG. 1), to view the video commercials and advertising on a location station. As indicated in box 701, an authorized user can activate a location station using his or her i.d. tag as explained previously. In so doing, commercial messages can be displayed to the user. As shown in FIG. 8, a banner is added inviting the user to attend a special event at 2:30.

Location stations can be configured for the facility such as a park to play short messages such as movie files when not being accessed by group members or guests for information and services as indicated in box 703 of FIG. 7. Using DVD, AVI or other technology, the location station when idle can run facility messages such, for example, as commercials, promotional visual applications to educate, entertain, or alert park guests. Wearing or otherwise using locators or tags is not required for access to this mode. It is immediately rendered busy upon activation of the location station by a locator or tag using guest or group member.

Figure 9:
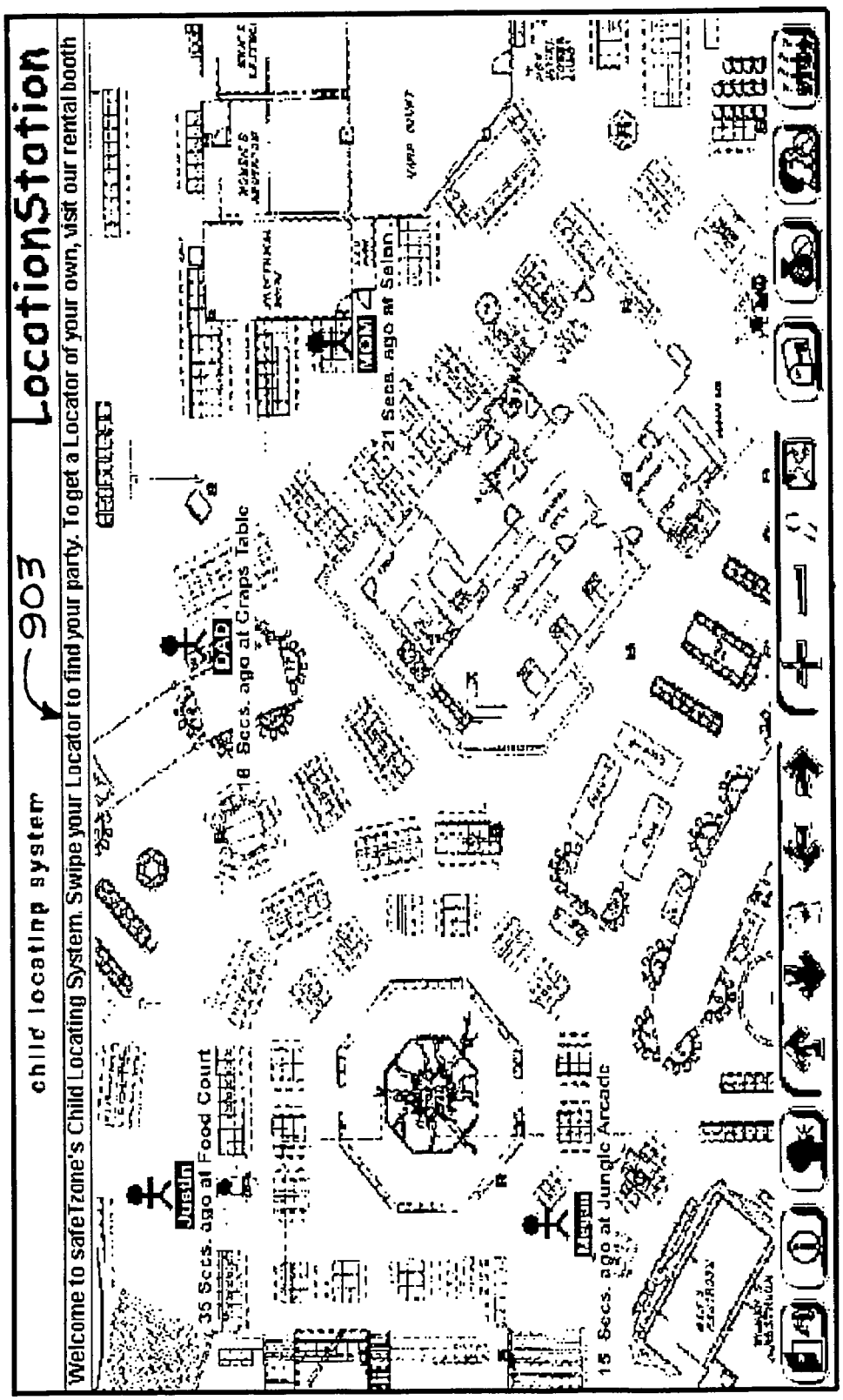

For example, as shown in FIG. 9, the person locating system is advertised via a banner display at 903.

Referring now to FIG. 10, there is illustrated notice of alert messages sent via electronic mail. As indicated in box 1001, the guest must be registered as a user via registration station of the child locating system 100 (FIG. 1) in order to use the message via e-mail function.

As indicated in box 1003, a guest elects at the registration station during registrations of his or her group whether they want to be alerted via electronic mail to their personal mobile device such as a telephone, pager or other web enabled or wireless apparatus if someone in their party accesses the "I AM LOST" or "ONE OF MY PARTY IS LOST" button on location station. As indicated in box 1003, when any member of the group uses the "I AM LOST" or "SOMEONE IN MY PARTY IS LOST" button on a location station, an "Alert" message is generated by use of these buttons and is sent automatically to the host computer or server 107 (FIG. 1), which in turn sends the alert message over a network such as the Internet to a personal mobile device such as a registered web enabled device such as a mobile telephone, pager, PDA, or other device carried or used by group members, instead of, or in conjunction with, the "Alert" message to security.

Figure 11:
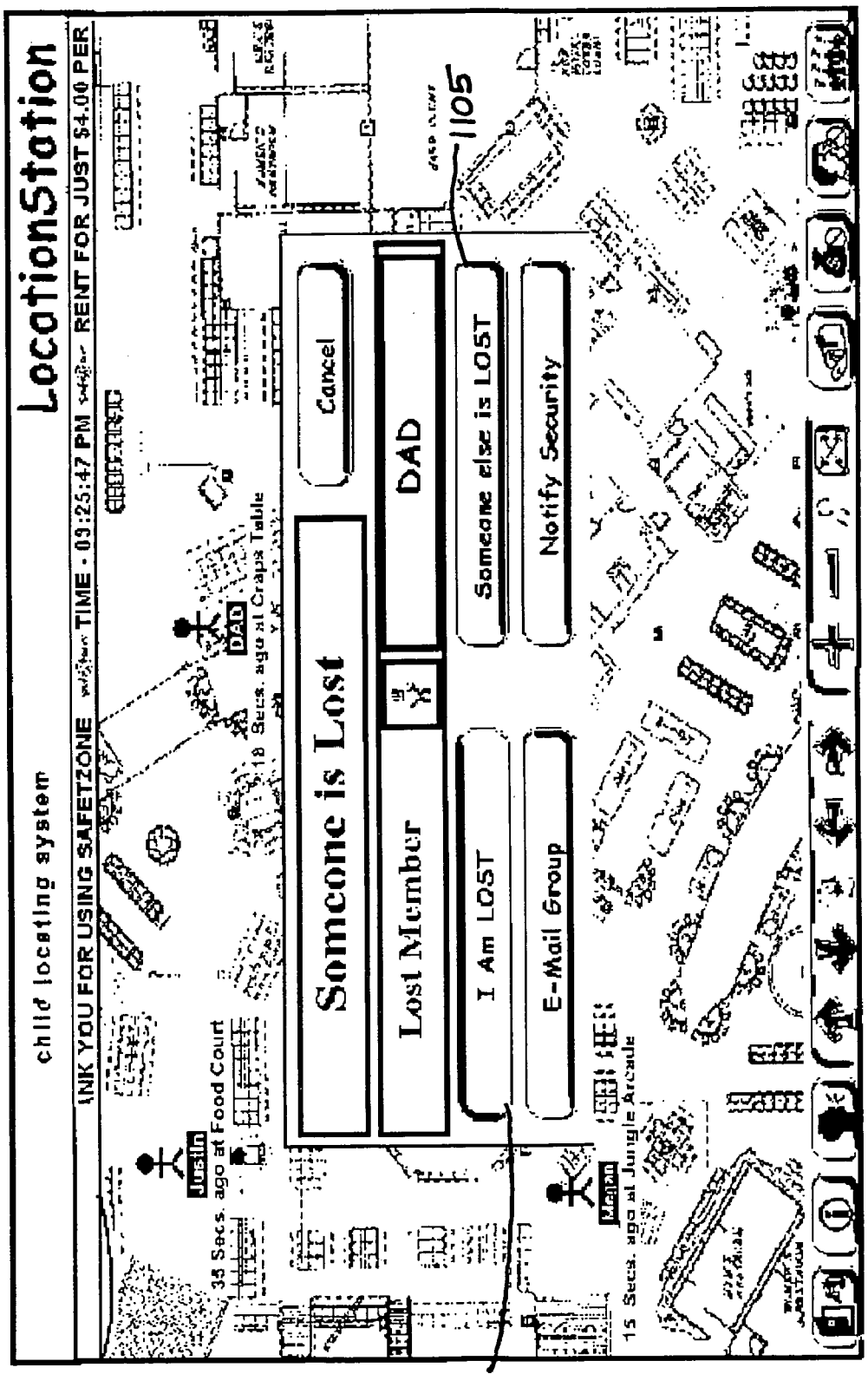
Figure 11A:
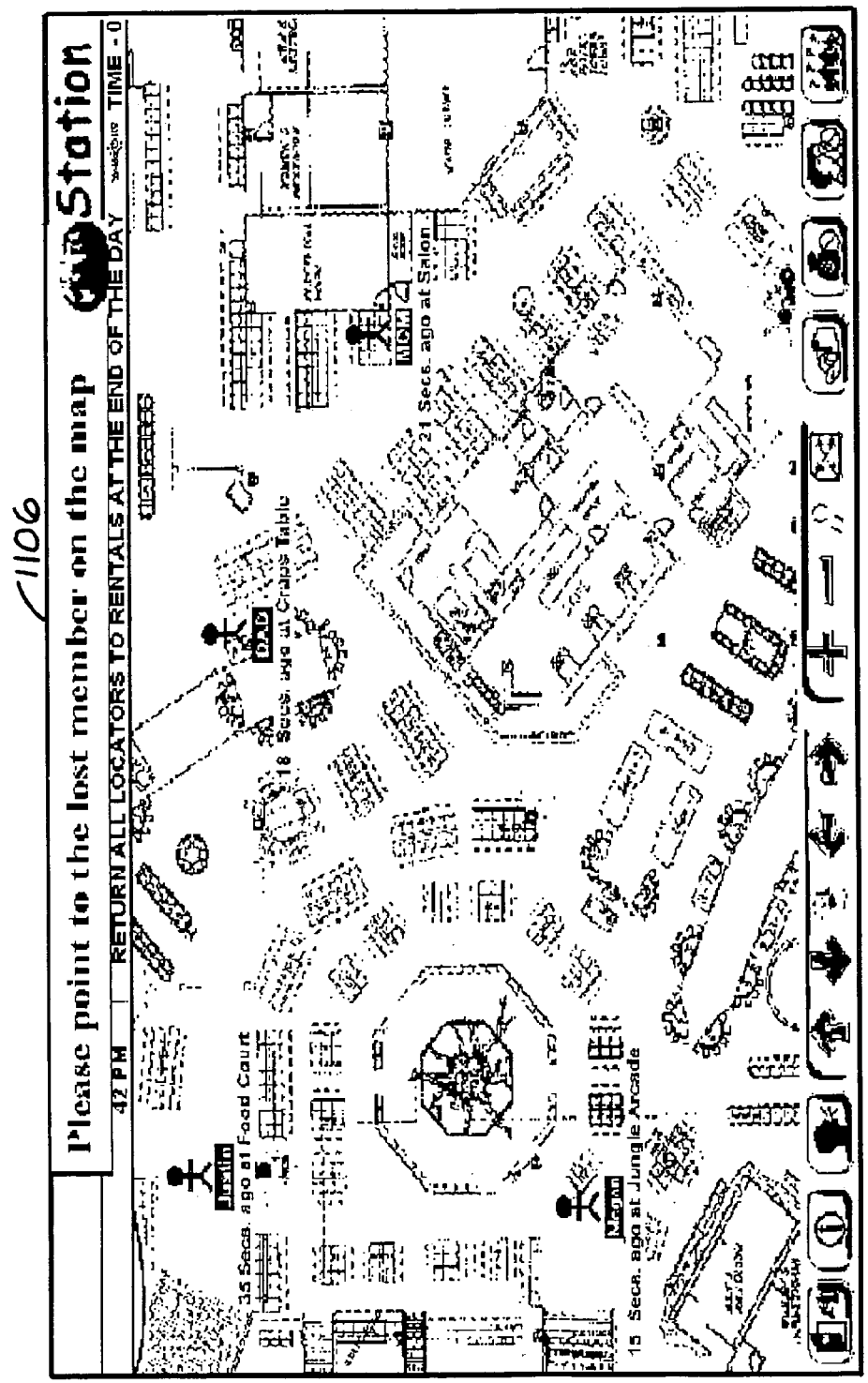
Figure 12:
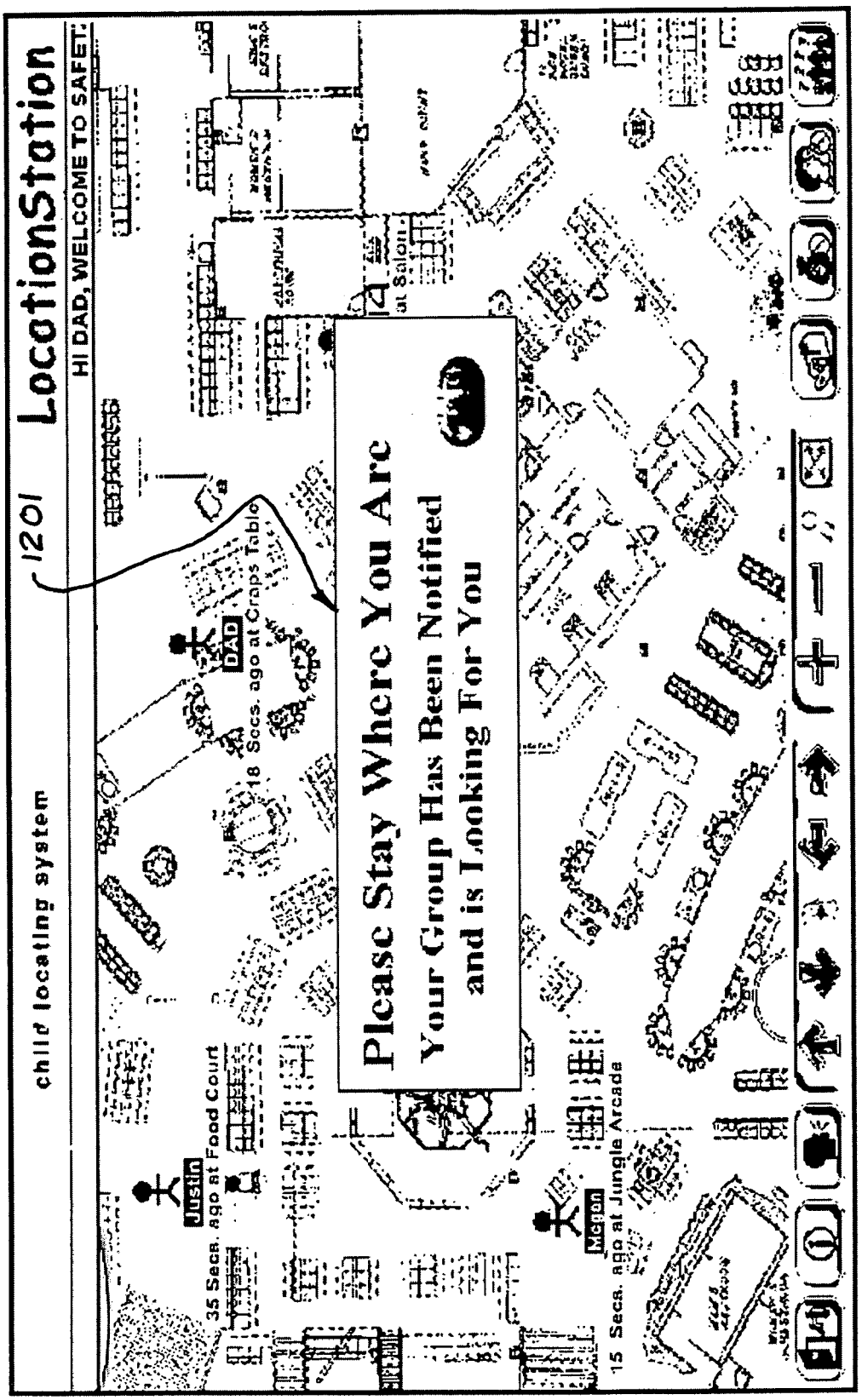

As shown in FIG. 11, when a registered group member selects either the "I AM LOST" button 1103 or the "SOMEONE IN MY PARTY IS LOST" button 1105, a drop down banner 1106 is displayed indicating that the group member should indicate which other member of the group is lost. For example, the banner 1106 indicates "Please point to the lost member on the map." Once the lost member is so identified, as indicated in FIG. 12, another drop down banner 1201 appears indicating "Please Stay Where You Are, Your Group Has Been Notified and is Looking For You."

Referring now to FIG. 13, there is illustrated an event messaging via e-mail mode of operation. As indicated in box 1301, the group member or guest may be registered as a user via the registration station of the locating system 100 (FIG. 1) in order to use the event messaging function.

Guests elect at the registration station 110 (FIG. 1) during registrations of his or her group whether they want to receive, via e-mail to their personal mobile device such as a telephone, pager or other web enabled or wireless apparatus to receive, "event" messages during the course of the day from the facility-to-group member, or the park to guest messaging system. If they register for such a service, then event messages are sent to the web enabled apparatus of the group members in a similar manner as the alert messages are transmitted.

While particular embodiments of the present invention have been disclosed, it is to be understood that various different modifications and combinations are possible and are contemplated within the true spirit and scope of the embodiments of the invention as disclosed and claimed herein. There is no intention, therefore, of limitations to the exact disclosure or abstract herein presented.

What is claimed is:

1. A method of message communication for a confined area of a facility, comprising:

receiving personal identification information of one member of a group into at least one of a set of stations distributed throughout the confined area;

displaying a message in response to the receipt of the personal identification information;

receiving into said at least one of the group of stations a request to find the location of other members of the group; and wherein the displaying of a message occurs at pre-set times during the day.

2. A method according to claim 1, wherein said message is an intra-facilily message for all groups of members.

3. A method according to claim 1, wherein said message is a facility-to-group member message.

4. A method of message communication for a confined area of a facility, comprising:

receiving personal identification information of one member of a group into at least one of a set of stations distributed throughout the confined area;

displaying a message in response to the receipt of the personal identification information;

receiving into said at least one of the group of stations a request to find the location of other members of the group; and sending messages to at least one of the stations for storage therein.

5. A method of message communication for a confined area of a facility, comprising:

receiving personal identification information of one member of a group into at least one of a set of stations distributed throughout the confined area;

displaying a message in response to the receipt of the personal identification information;

receiving into said at least one of the group of stations a request to find the location of other members of the group; and entering a member message into said at least one of the stations, and displaying the member message at one of the stations in response to another group member entering his or her personal identification information into said one of the stations.

6. A method according to claim 5, wherein said entering a member message includes selecting a stored message from a plurality of stored messages.

7. A method of message communication for a confined area of a facility, comprising:

receiving personal identification information of one member of a group into at least one of a set of stations distributed throughout The confined area;

displaying a message in response to the receipt of the personal identification information;

receiving into said at least one of the group of stations a request to find the location of other members of the group; and wherein said message is a facility message.

8. A method of message communication for a confined area of a facility, comprising:

receiving personal identification information of one member of a group into at least one of a set of stations distributed throughout the confined area;

displaying a message in response to the receipt of the personal identification information;

receiving into said at least one of the group of stations a request to find the location of other members of the group; and displaying a commercial message at at least one of the stations when idle.

9. A system of message communication for a confined area of a facility, comprising:

means for entering personal identification information of one member of a group into at least one of a set of stations distributed throughout the confined area;

means for displaying a message in response to the receipt of the personal identification information;

means for entering into said at least one of the group of stations a request to find the location of other members of the group; and wherein the displaying of a message occurs at pre-set times during the day.

10. A system according to claim 9, wherein said message is an intra-facility message for all groups of members.

11. A system according to claim 9, wherein said message is a facility-to-group member message.

12. A system of message communication for a confined area of a facility, comprising:

means for entering personal identification information of one member of a group into at least one of a set of stations distributed throughout the confined area;

means for displaying a message in response to the receipt of the personal identification information;

means for entering into said at least one of the group of stations a request to find the location of other members of the group; and means for sending messages to at least one of the stations for storage therein.

13. A system of message communication for a confined area of a facility, comprising:

means for entering personal identification information of one member of a group into at least one of a set of stations distributed throughout the confined area;

means for displaying a message in response to the receipt of the personal identification information; and means for entering into said at least one of the group of stations a request to find the location of other members of the group; and means for entering a member message into said at least one of the stations, and means for displaying the member message at one of the stations in response to another group member entering his or her personal identification information into said one of the stations.

14. A system according to claim 13, wherein said means for entering a member message includes selecting a stored message from a plurality of stored messages.

15. A system of message communication for a confined area of a facility, comprising:

means for entering personal identification information of one member of a group into at least one of a set of stations distributed throughout the confined area;

means for displaying a message in response to the receipt of the personal identification information;

means for entering into said at least one of the group of stations a request to find the location of other members of the group; and wherein said message is a facility message.

16. A system of message communication for a confined area of a facility, comprising:

means for entering personal identification information of one member of a group into at least one of a set of stations distributed throughout the confined area;

means for displaying a message in response to the receipt of the personal identification information;

means for entering into said at least one of the group of stations a request to find the location of other members of the group; and means for displaying a commercial message at at least one of the stations when idle.

17. A software system of message communication for a confined area of a facility, comprising:

module for entering personal identification information of one member of a group into at least one of a set of stations distributed throughout the confined area;

module for displaying a message in response to the receipt of the personal identification information;

module for entering into said at least one of the group of stations a request to find the location of other members of the group; and wherein the displaying of a message occurs at pre-set times during the day.

18. A software system according to claim 17, wherein said message is an intra-facility message for all groups of members.

19. A software system according to claim 17, wherein said message is a facility-to-group member message.

20. A software system of message communication for a confined area of a facility, comprising:

module for entering personal identification information of one member of a group into at least one of a set of stations distributed throughout the confined area;

module for displaying a message in response to the receipt of the personal identification information;

module for entering into said at least one of the group of stations a request to find the location of other members of the group; and module for sending messages to at least one of the stations for storage therein.

21. A software system of message communication for a confined area of a facility, comprising:

module for entering personal identification information of one member of a group into at least one of a set of stations distributed throughout the confined area;

module for displaying a message in response to the receipt of the personal identification information;

module for entering into said at least one of the group of stations a request to find the location of other members of the group; and module for entering a member message into said at least one of the stations, and module for displaying the member message at one of the stations in response to another group member entering his or her personal identification information into said one of the stations.

22. A software system according to claim 21, wherein said module for entering a member message includes selecting a stored message from a plurality of stored messages.

23. A software system of message communication for a confined area of a facility, comprising:

module for entering personal identification information of one member of a group into at least one of a set of stations distributed throughout the confined area;

module for displaying a message in response to the receipt of the personal identification information;

module for entering into said at least one of the group of stations a request to find the location of other members of the group; and wherein said message is a facility message.

24. A software system of message communication for a confined area of a facility, comprising:

module for entering personal identification information of one member of a group into at least one of a set of stations distributed throughout the confined area;

module for displaying a message in response to the receipt of the personal identification information;

module for entering into said at least one of the group of stations a request to find the location of other members of the group: and module for displaying a commercial message at at least one of the stations when idle.

* * * * *